United States Patent
Dolan et al.

(10) Patent No.: US 7,149,001 B1
(45) Date of Patent: Dec. 12, 2006

(54) SYSTEM FOR SUPPORTING A MULTIPLICITY OF COPY FEATURES

(75) Inventors: John E. Dolan, Vancouver, WA (US); John C. Dalrymple, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 694 days.

(21) Appl. No.: 09/710,026

(22) Filed: Nov. 7, 2000

Related U.S. Application Data

(60) Provisional application No. 60/166,485, filed on Nov. 19, 1999.

(51) Int. Cl.
H04N 1/40 (2006.01)

(52) U.S. Cl. ............ 358/443; 358/474; 358/296; 345/606; 382/298

(58) Field of Classification Search ........ 358/1.9–1.18, 358/426.05, 448, 474, 524, 540, 443, 296, 358/401, 449, 1.5, 1.1; 382/295, 293, 276, 382/298; 235/426.02; 345/606, 428; 709/216, 709/212, 237
See application file for complete search history.

(56) References Cited

U.S. PATENT DOCUMENTS

| | | | |
|---|---|---|---|
| 4,224,358 A | 9/1980 | Hare | |
| 4,284,456 A | 8/1981 | Hare | |
| 4,490,034 A | 12/1984 | Imai | |
| 4,598,999 A | 7/1986 | Kurata et al. | |
| 4,707,126 A | 11/1987 | Ohshima et al. | |
| 4,737,804 A | 4/1988 | Ayata et al. | |
| 4,743,945 A | 5/1988 | Ito et al. | |
| 4,743,975 A | 5/1988 | Ijuin | |
| 4,914,475 A | 4/1990 | Sugishima et al. | |
| 4,928,252 A | 5/1990 | Gabbe et al. | |
| 4,970,550 A | 11/1990 | Hirayama | |
| 5,016,051 A | 5/1991 | Morikawa et al. | |
| 5,049,932 A | 9/1991 | Sumida | |
| 5,099,336 A | 3/1992 | Moriya | |
| 5,124,799 A * | 6/1992 | Tsuboi et al. | 358/296 |
| 5,130,809 A | 7/1992 | Takayanagi | |
| 5,144,452 A | 9/1992 | Abuyama | |
| 5,191,429 A * | 3/1993 | Rourke | 358/296 |
| 5,229,866 A | 7/1993 | Kashiwagi et al. | |
| 5,239,387 A | 8/1993 | Stein et al. | |
| 5,298,731 A * | 3/1994 | Ett | 235/462.02 |
| 5,315,320 A | 5/1994 | Murano | |
| 5,475,475 A | 12/1995 | Kohtani et al. | |
| 5,510,896 A | 4/1996 | Wafler | |
| 5,533,171 A * | 7/1996 | Mirura | 395/111 |
| 5,636,007 A | 6/1997 | Yamashita | |
| 5,671,463 A | 9/1997 | Morikawa et al. | |
| 5,751,737 A | 5/1998 | Lagrotta et al. | |
| 5,768,484 A | 6/1998 | Arai et al. | |
| 5,777,753 A | 7/1998 | McShane et al. | |
| 5,794,104 A | 8/1998 | Maruyama | |
| 5,801,837 A | 9/1998 | Hamanaka et al. | |
| 5,867,279 A | 2/1999 | Funamizu et al. | |
| 5,916,723 A | 6/1999 | Hand | |
| 5,920,406 A | 7/1999 | Amidei | |
| 6,204,932 B1 * | 3/2001 | Haneda et al. | 358/1.9 |

FOREIGN PATENT DOCUMENTS

JP  11-308423  11/1999

* cited by examiner

*Primary Examiner*—Thomas D. Lee
*Assistant Examiner*—Heather D Gibbs
(74) *Attorney, Agent, or Firm*—Chernoff, Vilhauer, McClung & Stenzel

(57) ABSTRACT

A system for processing of a print ready data stream for an output device.

28 Claims, 11 Drawing Sheets

```
PAGE LOOP
  VERTICAL LOOP
    HORIZONTAL LOOP
    END HORIZONTAL LOOP
  END VERTICAL LOOP
END PAGE LOOP
```

FIG. 4

```
For each output page {
  For each vertical clone {
    Scan the input document
    For each RGB scanline {
      Process the scanline with IPP
      For each resulting CMYK binary scanline {
        // Call OPP with CTP mode
        If horizontal cloning is desired
          Generate the required number of horizontal clones
        If mirroring is desired
          reverse the scanline
```

FIG. 5

Scan the input document
For each RGB scanline {
   Process the scanline with IPP
   For each resulting CMYK binary scanline {
     *// Call OPP with CTP mode*
     Store each resulting scanline in memory
   }
}

For each page {
   *// Call OPP with PFM mode*
   For each vertical clone {
     For each CMYK binary scanline in memory {
       Retrieve scanline from memory
       If horizontal cloning is desired
          Generate the required number of horizontal clones
       If mirroring is desired
          reverse the scanline
     }
   }
}

FIG. 6

```
Task OPP {
    // This is where OPP's execution starts the first time it is called.
    // Initialize all necessary buffer space, variables, and registers.
    L = CurrentLine = NumOPPLines;
    N = CurrentVerClone = NumVertClones;
    EncodedSizeCount = 0;
    GlobalCompBufPointer = GlobalCompBufStart;
    VertClonePadLinesToDo = 0;

TASK_LOOP:
    // The following SUSPEND causes control to return to the executive
    // (outermost) loop, which calls each of the tasks in a round-robin fashion.
    // Any or all of OPP's "local" state (registers, variables, buffers etc.) could
    // be overwritten by the executive and/or by other tasks, while OPP is suspended.
    // In the implementation, any state that must persist while OPP is suspended
    // (e.g., state flags, buffer pointers, counts, etc.) must be explicitly saved in
    // global (off-chip) memory before SUSPEND, and restored before use after
    // return from SUSPEND. For clarity of presentation, these save/restore
    // operations are not explicitly shown in this pseudocode.
    SUSPEND (&OPPReturnAddress);

// Execution resumes here, each time (except for the very first time) that
    // the executive round-robin loop yields control back to OPP.
    // Check OPP's "idle" flag, and skip polling if cleared.
    if (!IDLE)  goto ACTIVATE_OPP;

// Poll for OPP Activate message from CPU, and clear idle flag if received.
    // If CPU has not sent us an Activate message, then loop back to suspend
    // and give other microcode tasks a chance to run.
```

FIG. 7A

```
CheckForCPUMessage (Message, Status);
if (Status == MESSAGE_NOT_RECEIVED)   goto TASK_LOOP;
if (Message != OPP_ACTIVATE)          goto TASK_LOOP;
IDLE = 0;

ACTIVATE_OPP:
    // Check for free output buffer, unless storing.
    if (DO_STORE && !DO_DECODE)  goto NO_OUTPUT_OK;

// Loop back and suspend if insufficient output buffer space is available
    // to hold a complete CMYK line in printer format. Note that a separate
    // output DMA task is responsible for removing data from OPP's output
    // buffer and for sending it on to the printer.
    if (!BufferFree (OPPOutBuf))  goto TASK_LOOP;

// Output buffer space is available. If we now need to output any
    // inter-vertical-clone pad lines, then output one now, update count of
    // pad lines remaining to be output, loop back and suspend.
    if (VertClonePadLinesToDo == 0)  goto NO_OUTPUT_OK;
    SetToWhite (OPPOutBuf);
    --VertClonePadLinesToDo;
    goto OUTPUT_CMYK_LINE;

NO_OUTPUT_OK:
    // Permit decode play out even with no input.
    if (DO_DECODE)  goto ENCODE_DONE;

// Check for full Cyan, Magenta, Yellow, and Black input buffers.
    // These would have been filled by IPP, and live in global memory.
```

FIG. 7B

```
if (!BufferFull (CyanInBuf))        goto TASK_LOOP;
if (!BufferFull (MagentaInBuf))     goto TASK_LOOP;
if (!BufferFull (YellowInBuf))      goto TASK_LOOP;
if (!BufferFull (BlackInBuf))       goto TASK_LOOP;

// Get local copies of the Cyan, Magenta, Yellow, and Black input
// buffers, and mark the space in global memory as empty, allowing
// IPP to place additional data there.
GetBuf (CyanInBuf, LocalCyanBuf);
GetBuf (MagentaInBuf, LocalMagentaBuf);
GetBuf (YellowInBuf, LocalYellowBuf);
GetBuf (BlackInBuf, LocalBlackBuf);

// Encode and measure compressed size if the mode demands it;
// otherwise permit copy through to the printer.
if (!DO_ENCODE)  goto ENCODE_DONE;

// Set up encoder and pointer to local compression buffer.
LocalCompBufPointer = LocalCompBufStart;
LocalSizeCount = 0;

// Call a bitonal compression algorithm to encode each of the Cyan,
// Magenta, Yellow, and Black inputs, one at a time, into the local
// compression buffer.  Each Encode operation conceptually advances the
// LocalCompBufPointer to the next free location past the thus-far-encoded
// region, and updates the local-memory variable LocalSizeCount.
Encode (LocalCyanBuf,    &LocalCompBufPointer, &LocalSizeCount);
Encode (LocalMagentaBuf, &LocalCompBufPointer, &LocalSizeCount);
Encode (LocalYellowBuf,  &LocalCompBufPointer, &LocalSizeCount);
Encode (LocalBlackBuf,   &LocalCompBufPointer, &LocalSizeCount);
```

FIG. 7C

```
// Update the global size-count running total, based on the local one.
EncodedSizeCount += LocalSizeCount;

// Check running total against buffer limit.  Note: the buffer limit is sufficiently smaller
// than the actual buffer size, to guarantee that a second scan of the same document
// (which due to noise might compress to a slightly larger size) will also fit within the buffer.
if (EncodedSizeCount < CompressBufLimit)   goto COMPRESSED_SIZE_OK;

// Otherwise clear encode flag, and fall back to simple CTP.
DO_ENCODE = 0;

// If we reach here with the store flag set, it is a fatal error!  This version
// of OPP need not be equipped to handle a buffer overflow during CTM.
// The expectation is that CME was run successfully first, and there
// is enough pad past the buffer limit so that the buffer can't possibly
// overflow during the second (CTM) scan.
if (DO_STORE)    send ERROR message to CPU and ABORT;

COMPRESSED_SIZE_OK:

// Permit play through to printer if we are not storing.
if (!DO_STORE) goto ENCODE_DONE;

// If we're storing, copy the valid portion of the local compression buffer.
// out to the next free region in the global compression buffer.  Increment
// the global compression buffer pointer by LocalSizeCount.
CopyBuf (LocalCompBufStart, &GlobalCompBufPointer, LocalSizeCount);

// Disable simultaneous store and print by looping back and suspending.
// Decrement and save input line counter until all input lines are stored.
L = --CurrentLine;
if (L)  goto TASK_LOOP;
```

FIG. 7D

```
// Storage finished: reset line count, change state, and loop back to
// relinquish control to the executive. The next time we get control,
// we will be in PFM mode.
DO_ENCODE = 0;
DO_STORE = 0;
DO_DECODE = 1;
L = NumOPPLines;
goto TASK_LOOP;

ENCODE_DONE:

// Check if we're decoding; if not, play the processed data through to the printer.
if (!DO_DECODE)  goto DECODE_DONE;

// Bring in one line's worth of CMYK data from the global compression buffer
// to the local compression buffer. The compressed data format includes embedded
// size information, so that the number of words that must be copied is determined
// by inspection of the compressed data.
// Set up local compression buffer pointer.
LocalCompBufPointer = LocalCompBufStart;

// Each copy operation transfers a line's worth of a plane's worth of image data, and
// advances the global and local compression buffers' pointers based on the record
// length information embedded in the compressed data.
// copy cyan record
GetCompressedData (&GlobalCompBufPointer, &LocalCompBufPointer);
// copy magenta record
GetCompressedData (&GlobalCompBufPointer, &LocalCompBufPointer);
// copy yellow record
GetCompressedData (&GlobalCompBufPointer, &LocalCompBufPointer);
```

FIG. 7E

```
// copy black record
GetCompressedData (&GlobalCompBufPointer, &LocalCompBufPointer);

// Decode (decompress) a line each of C, M, Y and K from the local compression
// buffer to the local C, M, Y and K buffers.  Each Decode operation advances the local
// compression buffer pointer to the next free location in the local compression buffer.
LocalCompBufPointer = LocalCompBufStart;
Decode (&LocalCompBufPointer, LocalCyanBuf);
Decode (&LocalCompBufPointer, LocalMagentaBuf);
Decode (&LocalCompBufPointer, LocalYellowBuf);
Decode (&LocalCompBufPointer, LocalBlackBuf);

// Decrement and save input line counter until all input lines have been decoded.
L = -- CurrentLine;
if (L) goto DECODE_DONE;

// We get here after the last scanline of each vertical clone.  Set the number of
// pad lines that must be output next (i.e., between the clone we just completed,
// and the next one, if any).  InterCloneVertGap is a system parameter.
VertClonePadLinesToDo = InterCloneVertGap;

// Prepare for the next vertical clone on this page.
// reset line count; decrement and save vertical clone counter
// until all vertical clones have been created.
L = NumOPPLines;
N = --CurrentVertClone;
if (N) goto DECODE_DONE;

// If we're here, we've completed a page.  Reset vertical clone count and pad count.
// and set IDLE flag so we will wait for the rest of the system components (output DMA task,
```

FIG. 7F

```
// CPU and printer) to finish all their remaining work for this page.  Note: The output DMA
// task maintains its own count of the number of lines per page, and it will send a message
// to the CPU after outputting the last line of the current page.  The CPU will send an
// Activate message to OPP after all is ready for OPP to begin playing out another page.
N = NumVertClones;
VertClonePadLinesToDo = 0;
IDLE = 1;

DECODE_DONE:
#ifdef THIS_IS_A_DRAFT_PIPELINE
// Perform 2x horizontal bit replication in place, to convert the horizontal
// sampling rate from that of IPP (300dpi) to that of the printer (600 dpi).
Rep2xHorizontal (LocalCyanBuf);
Rep2xHorizontal (LocalMagentaBuf);
Rep2xHorizontal (LocalYellowBuf);
Rep2xHorizontal (LocalBlackBuf);
endif // If the feature is selected, Perform Horizontal Cloning in place on the CMYK buffers.
if (HorizCloningIsEnabled) {
    HorizClone (LocalCyanBuf,     NumHorizClones);
    HorizClone (LocalMagentaBuf,  NumHorizClones);
    HorizClone (LocalYellowBuf,   NumHorizClones);
    HorizClone (LocalBlackBuf,    NumHorizClones);
}

// If the feature is selected, Perform Mirroring in place on the CMYK buffers.
if (MirroringIsEnabled) {
```

FIG. 7G

```
        Mirror(LocalCyanBuf);
        Mirror(LocalMagentaBuf);
        Mirror(LocalYellowBuf);
        Mirror(LocalBlackBuf);
    }
    // Format the CMYK data as required by the printer.
    ConvertFormat (LocalCyanBuf, LocalMagentaBuf, LocalYellowBuf,
            LocalBlackBuf, OPPOutBuf);

OUTPUT_CMYK_LINE:
#ifdef THIS_IS_A_DRAFT_PIPELINE

// Send the finished image line buffer to the output DMA task, and mark the
    // buffer as full.  Output DMA task will empty the buffer when it gets a chance.
    SendBufferToOutput (OPPOutBuf);

goto TASK_LOOP;
```

FIG. 7H

SYSTEM FOR SUPPORTING A MULTIPLICITY OF COPY FEATURES

CROSS-REFERENCE TO RELATED APPLICATIONS

This application claims the benefit of U.S. Provisional Application No. 60/166,485, filed Nov. 19, 1999.

BACKGROUND OF THE INVENTION

The present invention relates to processing of a sensed image for an output device.

Existing duplicating devices, such as for example a copy machine, a facsimile, and a scanner, include an imaging device for sensing image information (e.g., scanning or imaging) from an original document. The output of the duplicating device is stored in a file, transmitted across a network, or otherwise provided to an output device, such as a printer. Some duplicating devices include sufficient memory to store the sensed image in a compressed form or an uncompressed form. After storing the sensed image in the memory the duplicating device may provide the stored image to the output device (e.g., file, network, or printer) multiple times without having to re-sense the image. Depending upon the configuration, the system may permit simultaneous outputting (e.g., file, network, or printer) of the image and storing of the sensed image into memory. Unfortunately these systems, generally referred to as scan-once-print-many (SOPM), require significant amounts of memory to ensure that the entire image will fit within the memory. However, a sufficient amount of memory to store an entire image may be prohibitively expensive for consumer devices.

Existing duplicating devices may also include horizontal and vertical cloning capabilities, such as those disclosed in Tsuboi et al., U.S. Pat. No. 5,124,799. Likewise existing duplicating device may include mirror capabilities, such as those disclosed in Arai et al., U.S. Pat. No. 5,768,484. The image processing pipeline of the duplicating device incorporates the horizontal and vertical cloning, or the mirror process, and thereafter a print ready data stream is provided to the output device. Unfortunately, this technique requires substantial memory and computational requirements which may be cost prohibitive for consumer products.

What is desired, therefore, is a system that provides SOPM, horizontal cloning, vertical cloning, and/or mirror functionality in a cost effective manner.

BRIEF DESCRIPTION OF THE DRAWINGS

FIG. 4 is an illustration of nested loops.

FIG. 5 is an exemplary pseudo code of a copy finishing scenario without a significant memory buffer.

FIG. 6 is an exemplary pseudo code of a copy finishing scenario with a significant memory buffer.

FIGS. 7A–7H is another pseudo code of a copy finishing scenario.

DETAILED DESCRIPTION OF THE PREFERRED EMBODIMENT

It is highly desirable to support a number of copy features, such as mirroring, horizontal cloning, vertical cloning, scan-once-print-many, and combinations thereof. Existing devices, such as a copy machine, scanner, computer, etc. implement each of these features in some manner, however, an efficient implementation is still desirable that reduces the necessary computational resources.

Figure 1:
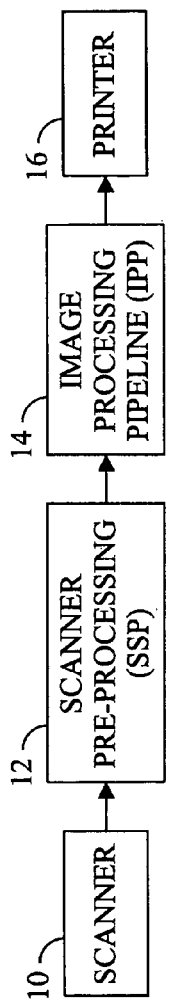
FIG. 1 is a block diagram of a typical copy machine image process flow.

Referring to FIG. 1, a typical copy machine image process flow includes a scanner 10 which senses an image. After sensing an image 10 a scanner pre-processing (SPP) process 12 typically comprises functions such as compensation for non-uniform illumination, compensation for pixel-to-pixel sensitivity variations in the image sensor arrays, and spatial alignment of signals obtained from image sensor arrays (such as red, green, and blue linear CCD arrays) that are physically non-coincident. In general the SPP process 12 compensates for non-uniformities of sensing the image. Other pre-processing functions may likewise be performed, as desired. The output of the SPP process 12 is provided to an image processing pipeline (IPP) process 14 which performs image processing functions, such as color conversions, image analysis to identify areas of text, spatial filtering (sharpening of text, smoothing of screened areas), image scaling, and halftoning. In general the IPP process 14 modifies the image based upon the image itself. After processing the image by the IPP process 14, a data stream representative of an image, such as a bitonal image map for inkjet printers, is provided to a printing device 16 potentially through a printer driver. In other words, the data stream is ready for printing without further image processing. The print ready data stream may need additional "wrapping" of header and address information, as necessary. It is to be understood that the duplicating device may be any type of sensing device, such as for example, a copy machine, a facsimile, and a scanner. The output of the duplicating device may be in any format, such as for example, stored in a file, transmitted across a network, a printer, or otherwise provided to an output device. Depending upon the configuration, the system may permit simultaneous outputting (e.g., file, network, or printer) of the image and storing of the sensed image into memory.

The typical approach to performing mirroring, horizontal cloning, vertical cloning, and scan-once-print many (SOPM) is to include such functionality in the IPP process 14. However, performing such functionality within the IPP process 14 requires additional memory to create the modified image which may include duplicated portions of the original image, as necessary, that is thereafter provided to the printer as a data stream including the complete image.

Figure 2:
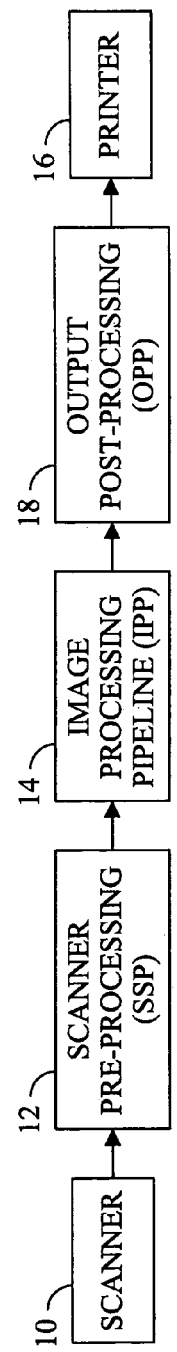
FIG. 2 is an exemplary block diagram of a modified copy machine image process flow in accordance with the present invention.

Referring to FIG. 2 in contrast to the traditional approach of performing the functionality of mirroring, horizontal cloning, vertical cloning, and SOPM, within the IPP process 14, the present inventors determined that the additional functionality should be provided as an output post-processing (OPP) process 18. The OPP process 18 is an efficient technique because the image processing for these particular processes is suitable for line-by-line processing on a "print ready" data stream. In contrast to the memory and computational capabilities for total image processing, line-by-line processing only requires limited memory and computational capabilities. By organization of the processes in this manner, the IPP process, which requires computational resources and time, need only be run once on each image even when providing multiple output images. The OPP process, or portions thereof, may be run multiple times on the same image data provided from the IPP process. In addition, the OPP process 18 may be retrofitted with an existing IPP process 14.

Figure 3:
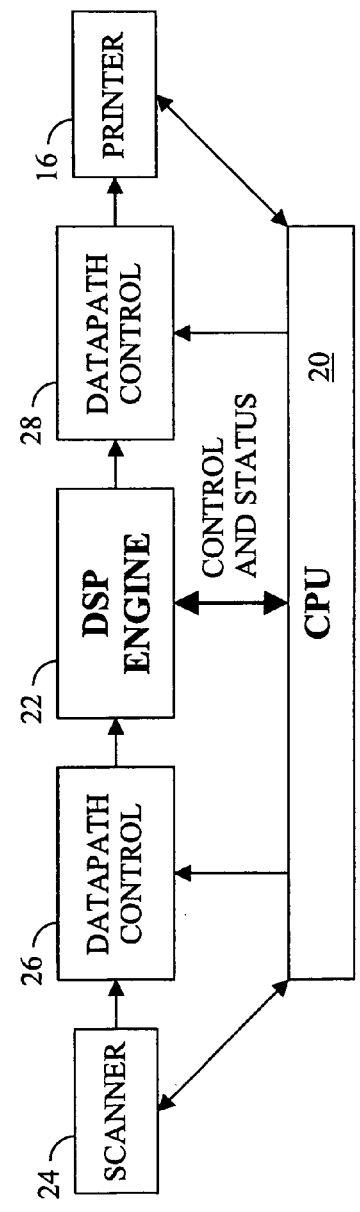
FIG. 3 is an exemplary block diagram of an implementation of the modified copy machine process flow of FIG. 2.

One implementation of the present invention may be in form of a multi-function machine, such a combination scanner, copier, facsimile, and/or printer. Referring to FIG. 3, a multifunction machine may include a copier control processor (CPU) 20, a digital signal processor (DSP) 22. The DSP 22 performs the SPP, IPP, and OPP image computations, as necessary. The CPU 20 provides commands to the scanner 24 and hence initiates the scanning functions of the scanner 24. The CPU 20 also controls (1) the data path control 26 from the scanner 24 to the DSP engine 22 and (2) the data path control 28 from the DSP engine 22 to the printer 16. In addition, the CPU 20 may "wrap" the image data from the DSP engine 22 with header and trailer data as required by the printer 16. Also, the CPU 22 may supervise the DSP engine's 22 execution of image processing. In order to achieve these results preferably the CPU 20 and the DSP engine 22 perform coordinated actions to achieve each specific function. The coordinative communication between the CPU 20 and the DSP engine 22 is depicted as a bi-directional arrow connecting the CPU 20 and the DSP engine 22. Other communications may be bi-directional, as desired. It is to be understood that any architecture may be used to achieve the desired functionality.

In many cases the output is provided to a raster scan line device, such as a laser or inkjet printer, where the pixels are ordered from left-to-right and top-to-bottom. As such, regardless of the particular finishing features selected, the output data (typically in the form of binary CMYK separation images) are transmitted to the printer in this raster-scan order. In this context, the set of finishing features may be defined as follows. Note that for this exemplary definition the "input" and the "output" are defined with respect to the data of the OPP process.

Mirror: This function reverses the order of the image in each output scan line. In other words, the data is provided to the printer for printing the image in a right-to-left fashion (where data is normally provided in a left-to-right fashion). This results in the image being mirrored along a vertical axis, such as for example, the central vertical axis of the image. It is to be understood that a portion of the image may be mirrored, if desired. The remainder of the image may be omitted or otherwise printed in a non-mirrored fashion.

Horizontal This function replicates each input scan line N times left-to-right across Clone the output scan line (or right-to-left across the output scan line). A portion of each horizontal scan line may be duplicated, if desired. The system may ensure that the width of the output scan line is at least N times as wide as the input scan line, or otherwise sufficiently wide to print the original image and the replicated portions thereof.

Vertical This function replicates each input image M times down the output page.

Clone In other words, the system plays out the set of the input image scan lines multiple times in succession. Fewer than all of the scan lines may be duplicated, if desired. The system may ensure that the output page contains at least M times the number of lines as the input image, or otherwise a sufficient number of lines to include the original image and replicated portions thereof.

SOPM This function replicates or otherwise generates the final composition of the output page multiple times across multiple pages. In other words, this sends the same output page to the output device as many times as desired. Preferably, the system only needs to scan the image once or twice to provide the necessary output pages.

With proper ordering of the finishing features, the system is able to provide any combination of the features in a consistent and efficient manner. Referring to FIG. 4, the most natural technique for performing the desired functionality is a set of nested loops. In a preferred ordering, the outermost loop handles the number of pages to be printed, a loop within the page loop handles the vertical clones, a loop within the vertical clone loop handles the horizontal clones. The vertical clone loop preferably includes both the horizontal clone processing followed by the mirror processing.

To perform the desired functionality, the flow of control provides one or more of four different OPP modes. The modes may include (1) copy to printer (CTP), (2) copy to printer and measure encoding (CME), (3) copy to memory (CTM), and (4) print from memory (PFM).

The copy to printer (CTP) function passes the data from the DSP engine 22 to the printer 16 without modification of the image by vertical cloning. Accordingly, the output of the IPP process 14 is passed to the printer 16 with modification each line of the image itself, as necessary, to perform horizontal cloning and mirroring. If desired, mirroring and horizontal cloning may be provided by the CTP function because only limited buffering is required to perform mirroring and horizontal cloning. For example, a buffer sufficient for a single output line may be used to store the resulting line of image data from horizontal cloning and mirroring.

Typically the scan lines are compressed as they are transmitted from the IPP with the OPP process 18 for the CME and CTM modes, and thereafter typically transmitted in an uncompressed format to the printer 16. The CME function is similar to the CTP process, but in addition simultaneously measures the total size of the compressed form of the input image. Preferably, the input image upon which the estimated compressed size is determined is the image provided by the IPP process 14, which is likely smaller than the resulting size of a compressed image after being cloned and mirrored. During the processing of the page to be printed, preferably using the CME process, the system determines if the compressed image can be stored within the available buffer.

If the compressed version of the image received from the IPP process 14 would fit within the available buffer then the system may scan the image once (another time if the first scan is not stored in memory) and then print the image from memory, including processing with the OPP process, as necessary. In this manner, multiple pages may be printed by the system without having to re-scan the image multiple times. This system provides the benefit of not requiring a buffer sufficiently large to handle any potential image size, which may be cost prohibitive. If the image does not fit within the available buffer, then the copy-to-printer (CTP) process is used to print the page, which may require scanning the input image once for each output page. It is advantageous to provide the OPP processes on the buffered image for the PFM process, as opposed to the resulting image after OPP processes, because the buffer requirements are less.

Due to random electronic noise in the scanning process and mechanical variations from one scan to the next, the present inventors have further determined that the compressed size of a subsequent scan may be significantly larger than the compressed size measured of a prior scan. With the realization of significant potential differences in the resulting compressed image size, the actual size of the compressed image should be sufficiently smaller than the actual buffer size, such as a fixed amount or a percentage difference. This difference in the buffer size increases the likelihood that the image may be reliably re-scanned and stored in the buffer. In other words, in order to determine whether the compressed image will fit within the available buffer based upon the prior scan, the measured size of the compressed image should be smaller than a threshold that is smaller than the available buffer.

The copy to memory (CTM) function may be used to scan an image to the buffer memory. The original document is scanned once, processed by the standard copier pipeline (SPP and IPP), and stored in the memory buffer, normally in a compressed format. Thereafter, the image data is retrieved (uncompressed if compressed) and processed by the OPP process as many times as are necessary to produce the required number of vertical clones and pages.

For use across a range of hardware architectures, the OPP process may support all finishing features both with and without a significant memory buffer. It is to be noted that without sufficient memory, true SOPM is not possible, and the OPP process degenerates to a scan-many-print many scenario.

Referring to FIG. 5 a block diagram is shown for an exemplary CTP OPP process without a memory buffer for a single page document. The preferred process includes a nested structure of (a) each output page which may require re-scanning of the page, (b) each vertical clone which may require re-scanning of the page for each vertical clone, and (c) mirroring and/or horizontal cloning of each scan line. This technique is a highly efficient process for processing each page without a sufficient buffer for an entire image. It is noted that IPP refers to the image processing pipeline and likewise includes the SPP process as well. Also, without a significant memory buffer the input page is re-scanned and reprocessed by the IPP for each vertical clone and for each output page.

Referring to FIG. 6 a block diagram is shown for an exemplary CTM process and PFM process with a memory buffer for a single page document. The upper portion describes the exemplary CTM process while the lower portion describes the exemplary PFM process.

Referring to FIGS. 7A–7H is another exemplary embodiment of pseudo code cast in the tasking framework of an Oak Technology, Inc. (formerly Pixel Magic, Inc) PM44I DSP chip. The framework and its constituent primitives are described in the PM44i SDK User's Guide (Pixel Magic, Inc., September 1999). The following pseudo code fragment shows in detail the flow of control and establishes that the compositions of finishing features are properly handled. Note that if OPP is in the CME state and a potential buffer overflow is detected, the state reverts to CTP and the copy is completed as a copy without memory scenario. Selectively reverting to CTP is more efficient because the additional computational cost required to continue measuring is avoided. Note also that when CTM executes successfully (i.e., when the entire page has been compressed and stored in memory), OPP switches automatically to PFM and executes the playback portion of the copy with memory scenario. The active states of OPP are themselves encoded by 3 flags as shown in the table below, where D→DO_DECODE; S→DO_STORE; and E →DO_ENCODE. An additional idle state exists which is in effect whenever an IDLE flag has the value 1. The only event that causes OPP to exit from idle state is an "activate" message from the CPU, which is only used during the playback portion of SOPM. The CPU sends this message after:

(1) sending any necessary trailer data to the printer for the Nth page;
(2) waiting for the printer to become ready to receive another page, if necessary;
(3) sending the header data for the $(N+1)^{st}$ page; and
(4) waiting for the printer to become ready to receive the image data for the $(N+)^{st}$ page, if necessary.

The pseudo code, the C-language "&" operator prefaces each argument of a (conceptual) function that is (conceptually) modified by execution of the function.

It is to be understood that the present invention of processing a print ready data stream may likewise be used for applications that do not include the scanning of an image, the SPP process, or the IPP process. In this case, the print ready data stream is provided to the OPP process however obtained. Likewise, the output device may include a display, etc. In addition it is to be understood that the term image is merely intended to denote that the data is representative of a sensed document, an image map, a set of characters that may be composed, or any other representation of an output.

The invention claimed is:

1. A method of processing an image comprising:
   (a) sensing said image from an original document wherein said image includes all of said document;
   (b) modifying said image by a first process to compensate for non-uniformities of sensing said image;
   (c) modifying said image by a second process based upon the image itself;
   (d) creating a print ready data stream as a result of the modifications of step (b) and (c);
   (e) providing a print ready data stream of said image to a third process;
   (f) modifying said image of said print ready data stream by said third process, where less than all of said image is stored by said third process in memory at any single point in time, wherein said third process has insufficient memory to store all of said image at any single point in time, including at least one of:
      (i) horizontally cloning at least a portion of said image of said print ready data stream;
      (ii) vertically cloning at least a portion of said image of said print ready data stream;
   (g) providing said modified image as a result of step (f) to an output device.

2. The method of claim 1 wherein said sensing is performed by a copy machine.

3. The method of claim 1 wherein said sensing is performed by a facsimile machine.

4. The method of claim 1 wherein said sensing is performed by a scanner.

5. The method of claim 1 wherein said output device is a printer.

6. The method of claim 1 wherein said output device is a file.

7. The method of claim 1 wherein said output device is a print ready file transferred across a network.

8. The method of claim 1 wherein said third process includes mirroring at least a portion of said image of said print ready data stream.

9. The method of claim 8 wherein said third process includes mirroring the entire said image.

10. The method of claim 1 wherein said third process includes horizontally cloning at least a portion of said image of said print ready data stream.

11. The method of claim 10 wherein said third process includes horizontally cloning the entire said image.

12. The method of claim 1 wherein said third process includes vertically cloning at least a portion of said image of said print ready data stream.

13. The method of claim 12 wherein said third process includes vertically cloning the entire said image.

14. A method of processing an image comprising:
  (a) providing a print ready data stream of an image to a first process, wherein said image includes all of a document;
  (b) modifying said image of said print ready data stream by said first process, where less than all of said image is stored by said a subsequent process to said providing at any single point in time, wherein said first process has insufficient memory to store all of said image at any single point in time, including at least one of:
    (i) horizontally cloning at least a portion of said image of said print ready data stream;
    (ii) vertically cloning at least a portion of said image of said print ready data stream;
  (c) providing said modified image as a result of step (b) to an output device.

15. The method of claim 14 further comprising sensing said image from an original document.

16. The method of claim 15 further comprising modifying said image by a first process to compensate for non-uniformities of sensing said image.

17. The method of claim 16 further comprising modifying said image by a second process based upon the image itself.

18. The method of claim 17 further comprising creating a print ready data stream as the result of said first and second processes.

19. The method of claim 14 wherein said output device is a printer.

20. The method of claim 14 wherein said output device is a file.

21. The method of claim 14 wherein said output device is a print ready file transferred across a network.

22. The method of claim 14 wherein said output device is a display.

23. The method of claim 14 wherein said first process includes mirroring at least a portion of said image of said print ready data stream.

24. The method of claim 23 wherein said third process includes mirroring the entire said image.

25. The method of claim 14 wherein said first process includes horizontally cloning at least a portion of said image of said print ready data stream.

26. The method of claim 25 wherein said first process includes horizontally cloning the entire said image.

27. The method of claim 14 wherein said third process includes vertically cloning at least a portion of said image of said print ready data stream.

28. The method of claim 27 wherein said first process includes vertically cloning the entire said image.

* * * * *

UNITED STATES PATENT AND TRADEMARK OFFICE
CERTIFICATE OF CORRECTION

| | |
|---|---|
| PATENT NO. | : 7,149,001 B1 |
| APPLICATION NO. | : 09/710026 |
| DATED | : December 12, 2006 |
| INVENTOR(S) | : John E. Dolan |

Page 1 of 1

It is certified that error appears in the above-identified patent and that said Letters Patent is hereby corrected as shown below:

<u>Col. 6, line 14</u>
Change "$(N+)^{st}$" to --$(N+1)^{st}$--.

Signed and Sealed this

Fourth Day of November, 2008

JON W. DUDAS
*Director of the United States Patent and Trademark Office*